United States Patent [19]
Mercs

[11] Patent Number: 5,978,045
[45] Date of Patent: Nov. 2, 1999

[54] EFFECTS PROCESSING SYSTEM AND METHOD

[75] Inventor: James S. Mercs, Huntington Beach, Calif.

[73] Assignees: Sony Corporation, Japan; Sony Electronics

[21] Appl. No.: 08/976,993

[22] Filed: Nov. 24, 1997

[51] Int. Cl.⁶ .................................................. H04N 9/74
[52] U.S. Cl. .................... 348/578; 348/571; 348/584; 348/185
[58] Field of Search ..................................... 348/578, 705, 348/722, 571, 584, 598, 594, 590, 586, 587, 8, 13, 177, 178, 182, 184, 185, 186, 189, 192, 193, 194; 702/189, 610, 190, 613, 196, 197; 345/328; 360/13; 382/52; 369/82

[56] References Cited

U.S. PATENT DOCUMENTS

| | | |
|---|---|---|
| 4,364,080 | 12/1982 | Vidovic ..................................... 348/185 |
| 4,685,003 | 8/1987 | Westland ................................. 360/14.1 |
| 5,051,845 | 9/1991 | Gardner .................................. 360/14.1 |
| 5,227,863 | 7/1993 | Bilbrey ..................................... 348/578 |
| 5,734,422 | 3/1998 | Maurer ..................................... 348/184 |
| 5,760,387 | 6/1998 | Ortyn ..................................... 250/201.3 |
| 5,781,729 | 7/1998 | Baker .................................... 395/200.6 |
| 5,874,988 | 2/1999 | Gu ............................................. 348/97 |

*Primary Examiner*—John K. Peng
*Assistant Examiner*—Wesner Sajous
*Attorney, Agent, or Firm*—Fulwider Patton Lee & Utecht, LLP

[57] ABSTRACT

A system for processing an input signal so as to automatically apply a plurality of effects thereto in a user-defined manner. The dynamics of the input signal are analyzed so as to generate a plurality of signal characteristics. Each signal characteristic is processed through a plurality of effects in a manner controlled by the user so as to be routed automatically to such of the effects in the plurality of effects as the user defines.

70 Claims, 3 Drawing Sheets

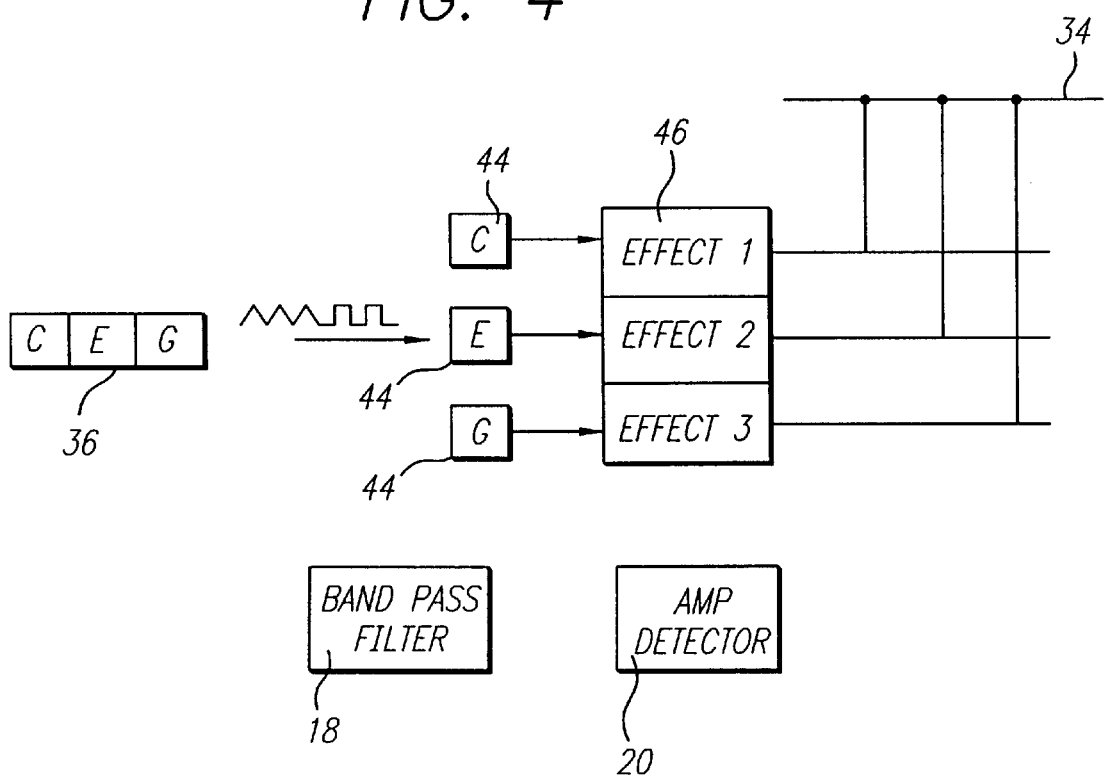

EFFECTS PROCESSING SYSTEM AND METHOD

BACKGROUND OF THE INVENTION

1. Field of the Invention

The present invention relates generally to signal processing, and, more particularly, to processing a signal which is analyzed to generate a plurality of signal characteristics, so as to automatically apply a plurality of effects to each of the characteristics in a manner defined by the user.

2. Art Background

Effects such as pitch shift, delay, flanging, echo, reverberation, equalization or compression have been applied to audio analog and digital signals, and effects such as color processing have been applied to video analog and digital signals, in audio and video signal processing. However, each signal has been processed in its entirety through each effect, requiring separate application of each of a plurality of effects to the entire signal, which is very time consuming, expensive, and inefficient.

Therefore, there has been a need existing for a system which is capable of analyzing the dynamics of a signal to generate signal characteristics, and applying selected ones of a plurality of effects to each signal characteristic, automatically in a manner defined by the user, for separate parallel processing of signal characteristics.

SUMMARY OF THE INVENTION

Briefly, and in general terms, the present invention provides a system for processing an input signal so as to enable a plurality of effects to be automatically applied to characteristics of the input signal in a manner defined by the user.

The system includes means for analyzing an input signal so as to generate a plurality of characteristics of the input signal. The system further includes means for routing the plurality of input signal characteristics, connected to the analyzing means, programmable by the user, to enable each input signal characteristic to be automatically routed to such of the plurality of effects as defined by the user.

One aspect of the present invention is that the system generates a plurality of characteristics of an input signal, so as to enable effects processing of each characteristic.

Another aspect of the present invention is that the system enables the user to define which effects are to be applied to each signal characteristic.

Still another aspect of the present invention is that the signal characteristics are automatically routed to the effects as defined by the user.

Other features and advantages of the invention will become apparent from the following detailed description taken in conjunction with the accompanying drawings, which illustrate, by way of example, the features of the invention.

BRIEF DESCRIPTION OF THE DRAWINGS

FIG. 3 is a block diagram of musical notes processed through a processing system in the prior art;

FIG. 4 is a block diagram of musical notes processed through an effects processing system in accordance with the present invention.

DETAILED DESCRIPTION OF THE PREFERRED EMBODIMENTS

Figure 1:
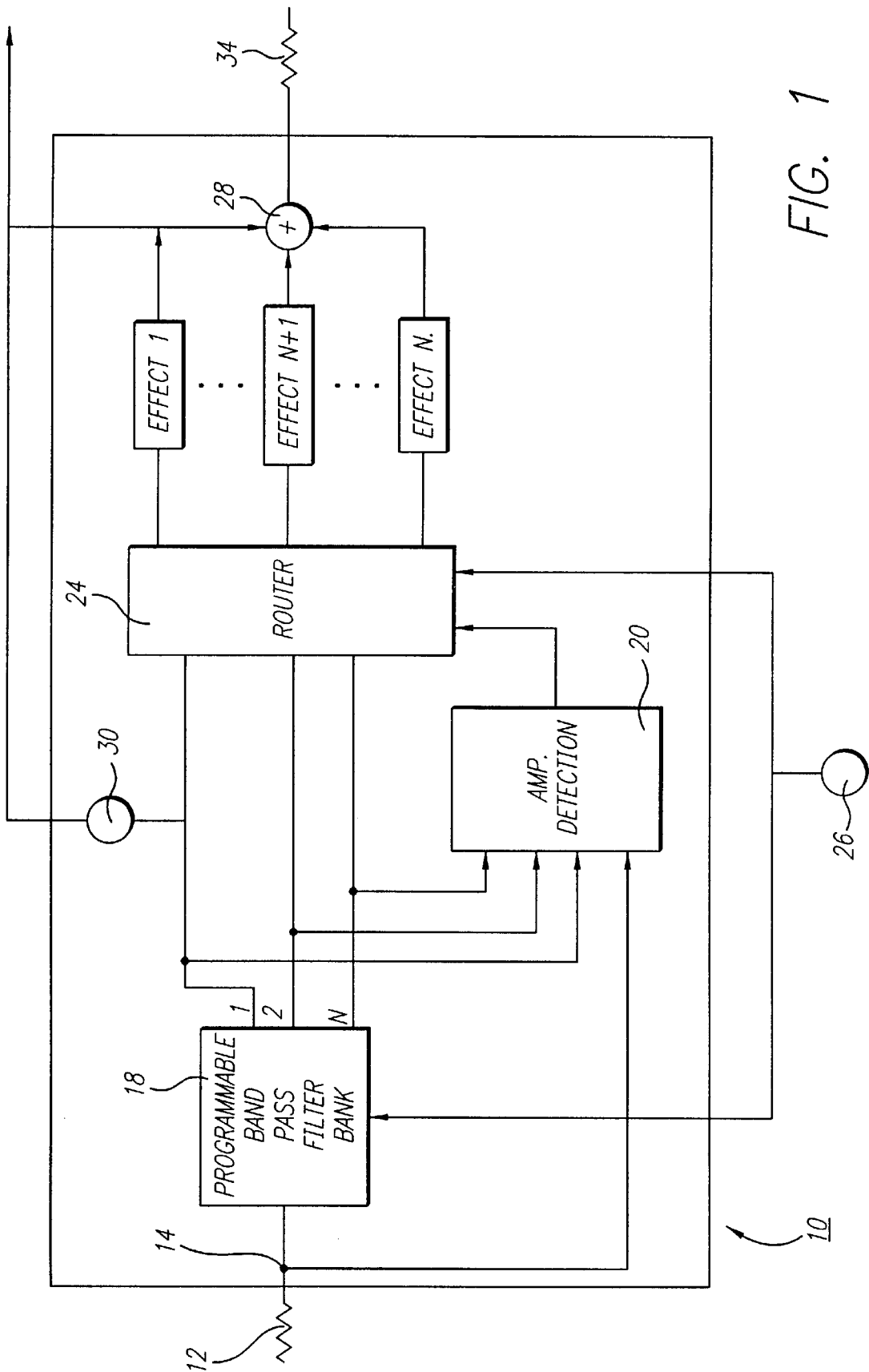
FIG. 1 is a schematic diagram illustrating an effects processing system in accordance with the present invention.
Figure 2:
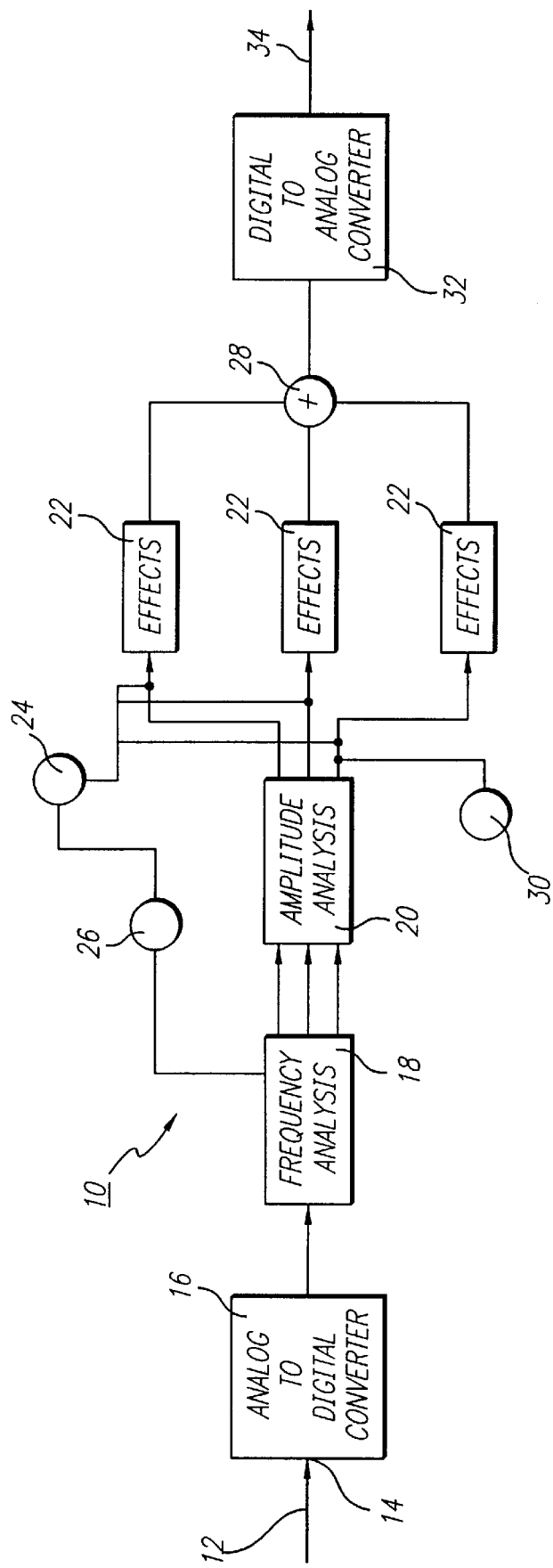
FIG. 2 is a block diagram of an effects processing system in accordance with the present invention.

Referring now to the drawings, and in particular to FIGS. 1 and 2, there is shown a system 10 for processing an input signal 12 to enable a plurality of effects to be automatically applied thereto. Input signal 12 may comprise an analog or digital audio or video signal. Where input signal 12 comprises an analog audio or video signal, system 10 may further include an analog-to-digital converter 14 for converting the analog input signal into a digital signal for processing. The effects to be applied to input signal 12 comprise effects applicable to the signal dynamics, and may comprise for example pitch shift, delay, flanging, echo, reverberation, equalization, or compression for an audio signal, and may include for example color processing for a video signal.

System 10 includes an interface 16 for enabling a signal to be input therein, and elements 18 and 20 for analyzing the dynamics of input signal 12. For an audio input signal, analyzing element 18 may comprise a band pass filter bank, which is programmable, for analyzing and filtering the spectrum of frequencies in the input signal, connected to interface 16 so as to analyze the input signal dynamics and generate input signal characteristics. Analyzing element 20 for the audio input signal may comprise an amplitude detector, for analyzing and detecting the amplitudes in the input signal associated with the signal frequencies, connected to filter bank 18 so as to further analyze input signal dynamics and further generate input signal characteristics. The audio input signal may include signal dynamics which may comprise for example midi time code position pointers, which may be analyzed by analyzing element 18 to generate input signal characteristics for effects processing. For a video input signal, the signal dynamics to be analyzed may comprise for example the spectrum of colors in the signal so as to generate input signal characteristics for effects processing which may include color correction.

System 10 may further include elements 22 for generating the plurality of effects applicable to signal dynamics, which element 22 may be internal to system 10 as shown, or external and adapted to be connected to system 10.

System 10 may also include a routing element 24, programmable by the user, for routing the plurality of input signal characteristics to the effects in effects generator 22 in the manner defined by the user. Routing element 24 may comprise an intelligent router, and may be connected to filter bank 18, amplitude detector 20, and effects generator 22. Each input signal characteristic may be automatically directed by router 24 to one or more of the effects in effects generator 22, in the manner defined by the user.

System 10 may still further include a control element 26, which may be synchronized and externally connectable to system 10, for controlling operation of programmable routing element 24 and programmable analyzing element 18 to which control element 26 is connected. Control element 26 may control routing element 24 and analyzing element 18 through pulses such as midi time code for an audio signal, time code for a video signal, or frequency band.

System 10 may also include an element 28, for combining the processed characteristics into an output signal 34. Where the processed signal comprises a digital audio or video signal converted from an analog signal in analog-to-digital converter 14, system 10 may also include a digital-to-analog converter 30 for converting the digital processed signal to an analog output signal.

System 10 may still further include an element 32 for enabling a characteristic or characteristics of the input signal to bypass routing element 24, for side chain processing to bypass routing element 24 and separately apply effects thereto other than those in effects generator 22 or not to apply any effects thereto, to be then combined in combining element 28 as part of output signal 34.

In a prior art processing system as shown in FIG. 3, a chord 36 which includes musical notes such as "C, E and G" may be analyzed as a unit in analyzer 36 to generate signal dynamics, and processed as a unit in through an effects processor 40 to generate an effects processed output 42. In a processing system of the present invention as shown in FIG. 4, the musical notes 44 in chord 36 are each separately analyzed in analyzing elements 18 and 20 to generate separate notes 44 based on signal dynamics, and each note 44 is separately routed to the plurality of effects 46 automatically in the manner defined by the user, and then recombined into the effects processed output signal.

In operation, an input signal 12 may be input to system 10 at interface 16. For example, where input signal 12 is an analog signal, it may then be converted to a digital signal in analog-to-digital converter 14. The signal dynamics may then be analyzed in analyzing elements 18 and 20 so as to generate a plurality of characteristics to be processed. For example, for an audio input signal, the audio spectrum may be analyzed in programmable band pass filter bank 18, which analyzes and filters the spectrum of audio frequencies, and in amplitude detector 20, which analyzes and detects audio signal amplitudes, so as to generate the plurality of characteristics to be processed. Control element 26 may control the analyzing in filter bank 18. Where the audio input signal includes midi time code position pointers, analyzing element 18 may analyze the pointers to generate the plurality of characteristics to be processed. Where the input signal comprises an analog audio signal, the analog audio input signal may be converted into a digital signal in analog-to-digital converter 14 for further processing. Where the input signal comprises a video input signal, the signal dynamics to be analyzed may comprise the color spectrum, and analyzing element 18 may analyze the spectrum of colors so as to generate the plurality of characteristics to be processed.

The input signal characteristics may then each be automatically routed through programmable routing element 24 to such of the plurality of effects, applicable to signal dynamics and generated in effects generator 22, as the user may define. The user may define in controlling element 26 the effects to which each input signal characteristic is directed in intelligent router 24, which controlling element 26 may also control the filtering of signal frequencies into signal characteristic in analyzing element 18. Controlling element 26 may generate control pulses which may be midi time code based for an audio signal, may be time code based for a video signal, or may be frequency based. For example, for an audio input signal a signal characteristic may be directed to effects such as pitch shift, delay, flanging, echo, reverberation, equalization, and/or compression, and a video input signal may be directed to effects including color processing.

An input signal characteristic or characteristics may be directed in bypassing element 32 so as to be side chain processed separately from characteristics directed in routing element 24 to effects generator 22, for applying separate effects thereto or for not applying any effects thereto.

The effects processed characteristics and any side chain processed characteristics may then be combined in combining element 28 so as to generate an output signal. Where the processed signal is a converted digital signal, it may be converted to an analog signal in digital to analog converter 30 to generate an analog output signal.

From the foregoing it will be appreciated that the system of the present invention provides advantages in selectively processing each of a plurality of input signal characteristics, generated by analyzing the input signal dynamics, through effects in a user-defined manner, to automatically generate an effects processed output signal. While particular forms of the invention have been illustrated and described, it will be apparent that various modifications can be made without departing from the spirit and scope of the invention. Accordingly, the invention is not to be limited, except as by the following claims.

What is claimed is:

1. A system for processing an input signal which includes a plurality of characteristics for enabling selected ones of a plurality of effects to be automatically applied to each of the plurality of characteristics of the input signal, comprising:

a plurality of effects;

means for analyzing the dynamics of the input signal so as to generate a plurality of characteristics of the input signal, programmable by the user; and means for routing each of the plurality of input signal characteristics through user selected ones of the plurality of effects, connected to the analyzing means, programmable by the users, to enable each input signal characteristic to be automatically routed to such of the plurality of effects as defined by the user.

2. The system of claim 1, wherein the input signal dynamics include a plurality of input signal frequencies, and the analyzing means comprise means for analyzing the spectrum of frequencies and filtering the plurality of input signal frequencies so as to generate the plurality of input signal characteristics.

3. The system of claim 1, wherein the input signal dynamics include a plurality of input signal amplitudes, and the analyzing means comprise means for analyzing the signal amplitudes and detecting the plurality of input signal amplitudes so as to generate the plurality of input signal characteristics.

4. The system of claim 1, wherein the input signal dynamics include midi time code position pointers, and the analyzing means comprise means for analyzing the midi time code position pointers so as to generate the plurality of input signal characteristics.

5. The system of claim 1, wherein the input signal dynamics include color and the analyzing means comprise means for analyzing the spectrum of color so as to generate the plurality of input signal characteristics.

6. The system of claim 1, wherein the routing means comprise an intelligent router.

7. The system of claim 1, further comprising means for controlling the routing means, connected to the routing means.

8. The system of claim 1, further comprising means for generating the plurality of effects, connected to the routing means.

9. The system of claim 1, further comprising means for enabling an input signal characteristic to bypass the routing means for separate side chain processing of the input signal characteristic, connected to the analyzing means.

10. The system of claim 1, wherein the effects comprise pitch shift.

11. The system of claim 1, wherein the effects comprise delay.

12. The system of claim 1, wherein the effects comprise flanging.

13. The system of claim 1, wherein the effects comprise echo.

14. The system of claim 1, wherein the effects comprise reverberation.

15. The system of claim 1, wherein the effects comprise equalization.

16. The system of claim 1, wherein the effects comprise compression.

17. The system of claim 1, wherein the effects comprise color processing.

18. The system of claim 1, wherein the input signal comprises an audio signal.

19. The system of claim 1, wherein the input signal comprises a video signal.

20. The system of claim 2, wherein the input signal dynamics further include a plurality of amplitudes, and the analyzing means further comprise means for detecting the plurality of input signal amplitudes associated with the signal frequencies so as to generate the plurality of input signal characteristics.

21. The system of claim 7, wherein the controlling means are further adapted to control the analyzing means.

22. The system of claim 7, wherein the controlling means are adapted to control the routing means through control pulses.

23. The system of claim 8, further comprising means for combining the processed characteristics into an output signal, connected to the effects generating means.

24. The system of claim 18, wherein the audio signal comprises an analog audio signal.

25. The system of claim 18, wherein the audio signal comprises a digital audio signal.

26. The system of claim 19, wherein the video signal comprises an analog video signal.

27. The system of claim 19, wherein the video signal comprises a digital video signal.

28. The system of claim 22, wherein the control pulses are midi time code based.

29. The system of claim 22, wherein the control pulses are time code based.

30. The system of claim 22, wherein the control pulses are frequency based.

31. The system of claim 23, further comprising means for enabling an input signal characteristic to bypass the routing means, for separate side chain processing of the input signal characteristic, connected to the analyzing means, and means for enabling a bypassed characteristic to be combined in the combining means.

32. The system of claim 24, further comprising means for converting the analog audio input signal into a digital audio signal for processing thereof.

33. The system of claim 26, further comprising means for converting the analog video signal into a digital video signal for processing thereof.

34. The system of claim 32, further comprising means for converting the digital audio signal into an analog audio signal after processing thereof.

35. The system of claim 33, further comprising means for converting the digital video signal into an analog video signal after processing thereof.

36. A method of processing an input signal which includes a plurality of characteristics for enabling selected ones of a plurality of effects to be automatically applied to each of the plurality of characteristics of the input signal, in a system which comprises a plurality of effects means for analyzing the dynamics of the input signal so as to generate a plurality of characteristics of the input signal, programmable by the user, and means for routing each of the plurality of input signal characteristics through user selected ones of the plurality of effects, connected to the analyzing means, programmable by the user, to enable each input signal characteristic to be automatically routed to such of the plurality of effects as defined by the user, the method comprising the steps of:

analyzing the dynamics of the input signal in the analyzing means so as to generate the plurality of characteristics of the input signal; and routing each of the plurality of input signal characteristics through user selected ones of the plurality of effects in the routing means so as to enable each input signal characteristic to be automatically routed to such of the plurality of effects as defined by the user.

37. The method of claim 36, wherein the input signal dynamics include a plurality of input signal frequencies, and the analyzing means comprise means for analyzing the spectrum of frequencies and filtering the plurality of input signal frequencies so as to generate the plurality of input signal characteristics, and the step of analyzing the input signal dynamics comprises filtering the plurality of input signal frequencies.

38. The method of claim 36, wherein the input signal dynamics includes a plurality of input signal amplitudes, and the analyzing means comprise means for analyzing the signal amplitudes and detecting the plurality of input signal amplitudes so as to generate the plurality of input signal characteristics, and the step of analyzing the input signal dynamics comprises detecting the plurality of input signal amplitudes.

39. The method of claim 36, wherein the input signal dynamics include a plurality of midi time code position pointers, and the analyzing means comprise means for analyzing the midi time code position pointers so as to generate the plurality of input signal characteristics, and the step of analyzing the input signal dynamics comprises analyzing the midi time code position pointers.

40. The method of claim 36, wherein the input signal dynamics include color and the analyzing means comprise means for analyzing the spectrum of color so as to generate the plurality of input signal characteristics, and the step of analyzing the input signal dynamics comprises analyzing the spectrum of color.

41. The method of claim 36, wherein the routing means comprise an intelligent router, and the step of routing the plurality of input signal characteristics comprises routing the characteristics in the intelligent router.

42. The method of claim 36, wherein the system further comprises means for controlling the routing means, connected to the routing means, further comprising the step of controlling the routing means in the controlling means.

43. The method of claim 36, wherein the system further comprises means for generating the plurality of effects, connected to the routing means, further comprising the step of generating the effects in the generating means.

44. The method of claim 36, wherein the system further comprises means for enabling an input signal characteristic to bypass the routing means for separate side chain processing of the input signal characteristic, connected to the analyzing means, further comprising the step of enabling an input signal characteristic to bypass the routing means through the bypass enabling means.

45. The method of claim 36, wherein the effects comprise pitch shift, and the step of routing the plurality of characteristics comprises routing the plurality of characteristics through the routing means to the pitch shift effect.

46. The method of claim 36, wherein the effects comprise delay, and the step of routing the plurality of characteristics comprises routing the plurality of characteristics through the routing means to the delay effect.

47. The method of claim 36, wherein the effects comprise flanging, and the step of routing the plurality of characteristics comprises routing the plurality of characteristics through the routing means to the flanging effect.

48. The method of claim 36, wherein the effects comprise echo, and the step of routing the plurality of characteristics comprises routing the plurality of characteristics through the routing means to the echo effect.

49. The method of claim 36, wherein the effects comprise reverberation, and the step of routing the plurality of characteristics comprises routing the plurality of characteristics through the routing means to the reverberation effect.

50. The method of claim 36, wherein the effects comprise equalization, and the step of routing the plurality of characteristics comprises routing the plurality of characteristics ranges through the routing means to the equalization effect.

51. The method of claim 36, wherein the effects comprise compression, and the step of routing the plurality of characteristics comprises routing the plurality of characteristics through the routing means to the compression effect.

52. The method of claim 36, wherein the effects comprise color processing, and the step of routing the plurality of characteristics comprises routing the plurality of characteristics through the routing means to the color processing effect.

53. The method of claim 36, wherein the input signal comprises an audio input signal, and the step of analyzing the dynamics comprises analyzing the dynamics of the audio input signal.

54. The method of claim 36, wherein the input signal comprises a video input signal, and the step of analyzing the dynamics comprises analyzing the dynamics of the video input signal.

55. The method of claim 37, wherein the input signal dynamics further include a plurality of amplitudes, and the analyzing means further comprise means for detecting the plurality of input signal amplitudes associated with the signal frequencies so as to generate the plurality of input signal characteristics, and the step of analyzing the dynamics further comprises detecting the plurality of input signal amplitudes so as to generate the plurality of input signal characteristics.

56. The method of claim 42 wherein the controlling means are further adapted to control the analyzing means, further comprising the step of controlling the analyzing means in the controlling means.

57. The method of claim 42, wherein the controlling means are adapted to control the routing means through control pulses, and the step of controlling the routing means comprises controlling the routing means through the control pulses.

58. The method of claim 43, wherein the system further comprises means for combining the processed characteristics into an output signal, connected to the effects generating means, further comprising the step of combining the processed characteristics into an output signal in the combining means.

59. The method of claim 53, wherein the audio signal comprises an analog audio signal, and the step of analyzing the dynamics comprises analyzing the dynamics of the analog audio signal.

60. The method of claim 53, wherein the audio input signal comprises a digital audio signal, and the step of analyzing the dynamics comprises analyzing the dynamics of the digital audio signal.

61. The method of claim 54, wherein the video signal comprises an analog video signal, and the step of analyzing the dynamics comprises analyzing the dynamics of the analog video signal.

62. The method of claim 54, wherein the video signal comprises a digital video input signal, and the step of analyzing the dynamics comprises analyzing the dynamics of the digital video input signal.

63. The method of claim 57, wherein the control pulses are midi time code based, and the step of controlling the routing means comprises controlling the routing means through midi time code based control pulses.

64. The method of claim 57, wherein the control pulses are time code based, and the step of controlling the routing means comprises controlling the routing means through time code based control pulses.

65. The method of claim 57, wherein the control pulses are frequency based, and the step of controlling the routing means comprises controlling the routing means through frequency based control pulses.

66. The method of claim 58, further comprising means for enabling an input signal characteristic to bypass the routing means for separate side chain processing of the input signal characteristic, connected to the analyzing means, and means for enabling a bypassed characteristic to be combined in the combining means, further comprising the steps of enabling an input signal characteristic to bypass the routing means in the bypass enabling means, and enabling the bypassed characteristic to be combined into the output signal in the combining means.

67. The method of claim 59, wherein the system further comprises means for converting the analog audio signal into a digital audio signal for processing thereof, further comprising the step of converting the analog audio signal into a digital audio signal in the analog audio signal converting means.

68. The method of claim 61, wherein the system further comprises means for converting the analog video signal into a digital video signal for processing thereof, further comprising the step of converting the analog video signal into a digital video signal for processing thereof in the analog video converting means.

69. The method of claim 67, wherein the system further comprises means for converting the digital audio signal into an analog audio signal after processing thereof, further comprising the step of converting the digital audio signal into an analog audio signal in the digital audio signal converting means.

70. The method of claim 68, wherein the system further comprises means for converting the digital video signal into an analog video signal after processing thereof, further comprising the step of converting the digital video signal into an analog video signal in the digital video signal converting means.

* * * * *